March 27, 1951

E. PETERSON 2,546,371

GENERATION OF PULSES OF ALTERNATELY OPPOSITE POLARITIES

Filed Dec. 22, 1947

INVENTOR
E. PETERSON
BY Harry C. Hart
ATTORNEY

Patented Mar. 27, 1951 2,546,371

UNITED STATES PATENT OFFICE 2,546,371

GENERATION OF PULSES OF ALTERNATELY OPPOSITE POLARITIES

Eugene Peterson, New York, N. Y., assignor to Bell Telephone Laboratories, Incorporated, New York, N. Y., a corporation of New York Application December 22, 1947, Serial No. 793,305

3 Claims. (Cl. 250—27)

This invention relates to pulse generation and particularly to generation of a sequence of pulses which are like in magnitude and alternately opposite in polarity.

In communication systems of various sorts circumstances arise in which there is required a sequence of relatively short pulses which are equal in magnitude and alternately opposite in polarity. It is known to produce such a pulse sequence in an approximate fashion in the following manner. The pulses of a basic pulse source, such as a multivibrator, are applied to a polarity-reversing delay device, such as a short-circuited transmission line of proper length. The pulses which are returned from the reflecting end of the line are of opposite polarity with respect to the original pulses and somewhat delayed with respect to them. The returned pulses are now added to the original pulses to provide a derived pulse sequence. In the derived sequence there first occurs a short pulse which starts with an original pulse and terminates with the arrival of its reflection. At the termination of the original pulse, there then appears another short pulse of polarity opposite to the first, which endures until the termination of the reflected pulse, whereupon the cycle is repeated. Alternatively, the basic pulse source output may be applied to two paths in parallel, in one of which a delay line is interposed. Either the delayed pulse or the undelayed one may be reversed in polarity and the two resulting pulse sequences may be added together by way of a suitable network such as a hybrid coil.

With known devices the derived pulse sequence falls short of the ideal by reason of the fact that every known delay device is characterized by an inherent attenuation. Therefore, the delayed pulse, while nominally of magnitude equal to that of the original pulse is not exactly so. As a result, that part of the wave form of the derived sequence which interconnects the desired pulses deviates from the zero line, and the polarity of the deviation changes from cycle to cycle. In what follows, this wave form defect is termed a zero shift. In the second alternative arrangement above referred to, this effect can, of course, be compensated by amplifying the delayed pulse to restore its magnitude to the proper value, or by attenuating the undelayed pulse to match the delayed one, but only at the cost of additional apparatus involving at least a two-stage amplifier. (A cathode follower cannot serve this purpose because its amplification factor is never quite equal to unity.) Furthermore, in a system in which variation of the pulse length of the derived sequence is a requirement, this is conveniently carried out by altering the length of the delay line, in which case the attenuation of the line is altered in proportion to its delay and, if an amplifier or an attenuator is employed, its gain or loss must be readjusted.

In accordance with the present invention the defects of the wave form are cured in a simple and direct manner without resort to additional apparatus by the use of a special network which removes or "clips' from the derived pulse sequence all amplitudes which are equal to the maximum value of the zero shift or less. In a preferred form the network comprises a pair of diode rectifiers which are connected in series with the derived pulse sequence output and so biased that, when in the derived pulse sequence the amplitude exceeds a preassigned positive threshold, one diode conducts; when the amplitude exceeds a preassigned negative threshold, the other diode conducts; while, when the amplitude does not exceed either threshold, neither diode conducts.

The invention will be fully apprehended from the following detailed description of a preferred embodiment thereof taken in connection with the appended drawings in which.

Figure 1:
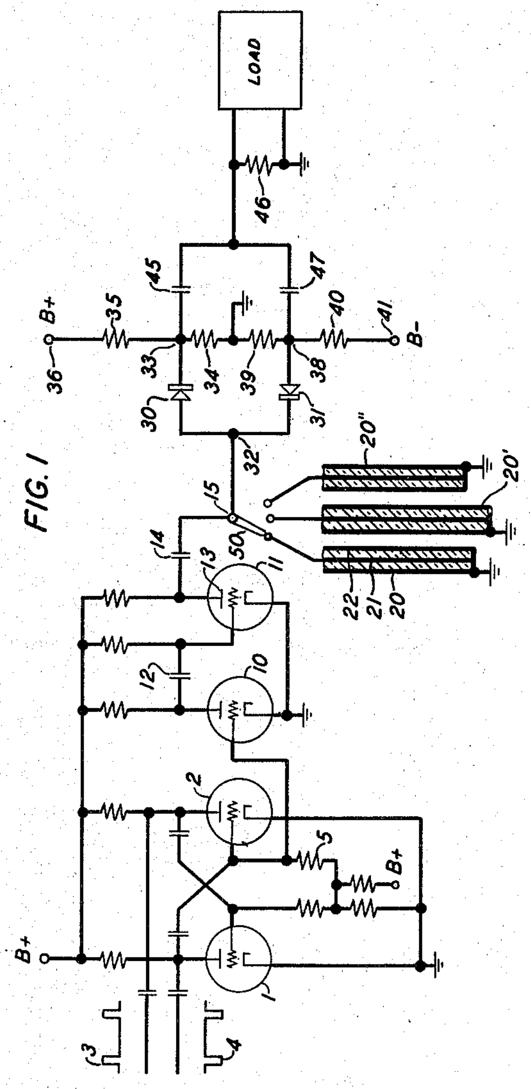
Fig. 1 shows a circuit diagram of apparatus embodying the invention.
Figure 2:
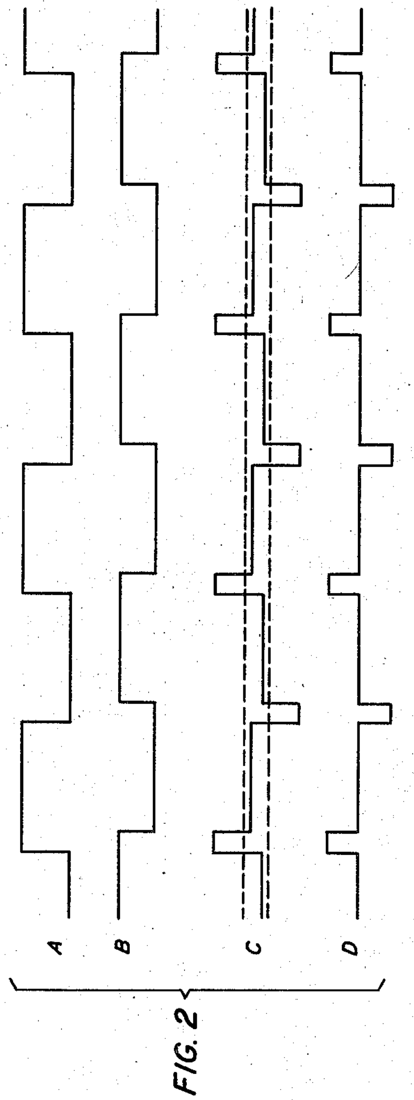
Fig. 2 is a group of wave forms of assistance in understanding the operation of Fig. 1.

Referring now to Fig. 1, there is shown at the left of the figure a pair of triodes 1, 2 intercoupled as a conventional multivibrator, that is to say, the anode of each triode is coupled by way of a condenser to the control grid of the other triode. As is well known such an arrangement, either by itself or in response to timing pulses 3, 4, which may be applied to the anodes, delivers from an output terminal, for example across the grid resistor 5 of the right-hand tube 2, a sequence of pulses each of which occupies approximately one half of the full period. Such a pulse sequence is shown in curve A of Fig. 2.

The output grid resistor 5 of the multivibrator is connected to the input terminal of a buffer amplifier which may comprise two triodes 10, 11 connected in tandem, that is to say, the anode of the first is connected by way of a coupling condenser 12 to the control grid of the second. The output of this buffer amplifier is taken from the anode 13 of the second tube 11, and by way of a coupling condenser 14 to a branch point 15. To this branch point there is connected a device which, when actuated by a sequence of pulses appearing at its input terminals, generates another sequence of pulses each of which is reversed in polarity with respect to the original sequence and delayed with respect to it as well. A suitable device for the purpose is a short-circuited delay line, indicated in the figure as a coaxial cable 20 of which the inner conductor 21 is connected to the outer conductor 22 and to ground at the far end. With this arrangement, reflected pulses which are both reversed and delayed appear at the branch point 15, as well as the original pulse sequence. The reversed and delayed pulses are shown in curve B of Fig. 2. By reason of the inherent attenuation of the delay line 20, the magnitudes of the reflected pulses, which are nominally equal to the magnitudes of the original pulses, are in fact only approximately so. As a result, the wave form of the derived pulse sequence, which comprises the sum or addition of the reflected pulses and the original pulses appearing at the branch point 15, is as indicated in the curve C of Fig. 2. Evidently the intermediate part of curve C between the pulses of the derived pulse sequence shifts from cycle to cycle instead of being constant.

In accordance with the invention, the resulting derived pulse sequence, including its shifting intermediate part (curve C) is now applied to a network which may comprise two oppositely connected rectifiers, for example diodes 30, 31, the anode of one being connected to the cathode of the other. The branch point 15 is connected to the point 32 which is common to the two diodes. The cathode of one diode 30 is connected to a bias point, for example, the point 33 which is common to two resistors 34, 35 in series between ground and a suitable positive source voltage 36, and the anode of the other diode 31 is similarly connected to a bias point 37, for example a point 38 which is common to two resistors 39, 40 connected in series between ground and a negative voltage source 41. Additionally, the cathode of one diode is connected by way of a condenser 45 and a loading resistor 46 to ground, while the anode of the other diode is connected by way of another condenser 47 and the same loading resistor 46 to ground. The magnitude of biases is preferably slightly in excess of the difference between the magnitudes of the pulses of the original sequence (curve A) and the reflected pulses (curve B). For example, if the original pulses are of 10 volt amplitude and one volt is lost by attenuation in the delay line, the biases may be 1.5 volts.

With this circuit arrangement the first diode 30 is so biased that substantially no current flows through it when the voltage applied to it has any negative value or a small positive value up to, for example, 1.5 volts, while the other diode 31 is so biased that no current flows through it when the applied voltage has any positive value or any negative value down to, for example, —1.5 volts. Therefore when the applied voltage lies between +1.5 volts and —1.5 volts, neither diode is conductive, and a shifting zero in the applied derived pulse sequence results in no current flow through the network and therefore in no voltage across the output load resistor 46. On the other hand, upon the arrival of a positive pulse of magnitude substantially exceeding 1.5 volts, the upper diode 30 becomes conductive and a positive voltage pulse appears across the load resistor 46. Similarly, on the arrival of a negative voltage pulse of the applied derived pulse sequence of magnitude substantially exceeding —1.5 volts, the lower diode 31 conducts and a negative pulse appears across the load resistor 46. The resulting pulse sequence, with the zero shift of curve C clipped out and so removed, is shown on curve D of Fig. 2. The positive and negative biases are of course not necessarily equal.

In order to vary the lengths of the positive and negative pulses of the derived sequence, it is only necessary with the circuit arrangement of the invention to alter the length of the delay line. Provision is made for such alteration by substituting delay lines 20′ and 20″, of different lengths, selection of the line of suitable length being effected by a switch 50. As the length of the delay line is varied, the attenuation which is inherent in its operation likewise varies. However, the resulting zero shift of the derived pulse sequence is entirely removed as long as the difference between the magnitudes of the reflected pulses and of the original pulses does not exceed the difference between the bias voltages of the two rectifier diodes.

It will be apparent to those skilled in the art that the invention may also be carried out by the use of basic pulse sources of other types, delay devices which may be of various sorts and by modification of the low level clipping network described above.

What is claimed is:

1. A primary source of periodic pulses of like amplitudes and polarities, a secondary source of pulses of like period, of opposite polarities, and of less amplitudes than the pulses of the primary source, a balanced pair of similar diodes; the first diode being adapted to conduct a current substantially proportional to the positive excess of a positive voltage applied to it above a preassigned positive threshold voltage, the second diode being adapted to conduct a current substantially proportional to the negative excess of a negative voltage applied to it below a preassigned negative threshold voltage, connections for applying the voltage of both sources to each of said diodes as a sequence of pulses of alternately opposite polarities and having a zero which shifts by the amount of the amplitude difference between the pulses of the primary source and the pulses of the secondary source, and biasing means rendering both of said diodes non-conductive for applied voltages of either polarity which are not greater in amplitude than the amplitude of said zero shift, whereby the current output of said diodes taken together constitutes a sequence of pulses of alternately opposite polarities and without zero shift.

2. In combination with a load and a source of a sequence of voltage pulses of alternately opposite polarities, said source delivering a potential at times between the occurrences of the pulses which, though nominally of zero amplitude, is actually of a small finite amplitude which shifts in polarity from cycle to cycle to said pulse sequence, apparatus for establishing said interpulse potential at zero value by removing the zero shift therefrom, which comprises a network connected in series between the source and the load, said network comprising a pair of oppositely poled diodes connected in parallel and a bias source therefor, one of said diodes being biased by said source to be conductive on the application to the network of a positive voltage in excess of a preassigned positive threshold, the other of said diodes being biased to be conductive on the application to the network of a negative voltage in excess of a preassigned negative threshold, the potential separation of said two thresholds being in excess of the zero shift to be removed.

3. In apparatus for generating a train of potential pulses which are of alternately opposite polarities and of like amplitudes and which are separated by intervals of nominally zero potential, which apparatus comprises a source of original pulses of like amplitudes and polarities, each of which endures for a substantial fraction of a cycle, means for deriving from said original pulse train a second train of pulses, inverted in polarity and delayed with respect to said original pulses and of amplitudes which are nominally like the amplitudes of the original pulses, and means for combining the pulses of the second train with the pulses of the original train to provide a third pulse train, in which a deviation of the amplitudes of the second train pulses from equality with the amplitudes of the first train pulses results in a shift of the nominal zero potential of the third train from true zero to some other value, and a load in which the pulses of the third train are utilized; means for removing said shifting zero potential from the third pulse train, which comprises a network connected in series between the source and the load, said network comprising a pair of oppositely poled diodes connected in parallel and a bias source therefor, one of said diodes being biased by said source to be conductive on the application to the network of a positive voltage in excess of a preassigned positive threshold, the other of said diodes being biased to be conductive on the application to the network of a negative voltage in excess of a preassigned negative threshold, the potential separation of said two thresholds being in excess of the zero shift to be removed.

EUGENE PETERSON.

REFERENCES CITED

The following references are of record in the file of this patent:

UNITED STATES PATENTS

| Number | Name | Date |
|---|---|---|
| 1,959,275 | McCaa | May 15, 1934 |
| 2,031,539 | McCaa | Feb. 18, 1936 |
| 2,265,996 | Blumlien | Dec. 16, 1941 |
| 2,266,154 | Blumlien | Dec. 16, 1941 |

FOREIGN PATENTS

| Number | Country | Date |
|---|---|---|
| 520,426 | Great Britain | Apr. 24, 1940 |

OTHER REFERENCES

Ultra-high Frequency Techniques, Brainerd-Koehler, Reich, Woodruff, pages 179, 180. (Figures 4–14.)